E. W. ANDEREGG.
FLY NET.
APPLICATION FILED APR. 16, 1914.
1,156,654.
Patented Oct. 12, 1915.
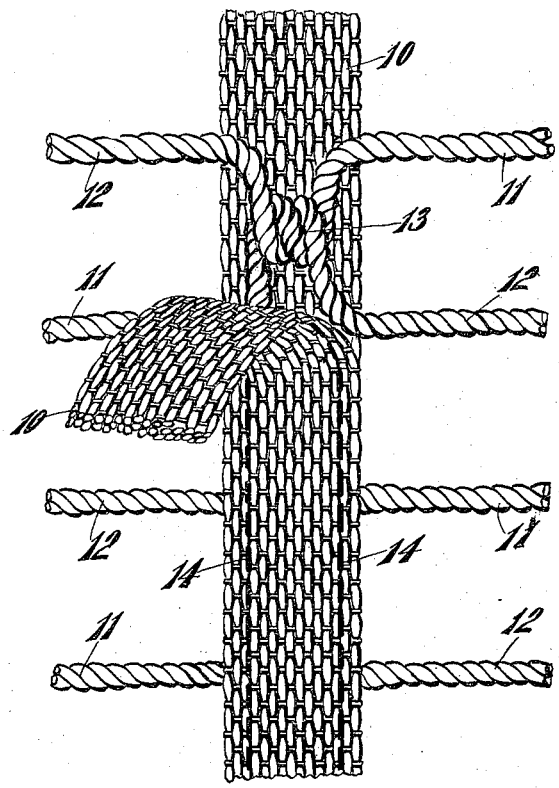

UNITED STATES PATENT OFFICE.

EDWARD W. ANDEREGG, OF ALGOMA, WISCONSIN, ASSIGNOR TO GEM HAMMOCK & FLY NET CO., OF MILWAUKEE, WISCONSIN.

FLY-NET.

1,156,654.      Specification of Letters Patent.      Patented Oct. 12, 1915.

Application filed April 16, 1914. Serial No. 832,142.

*To all whom it may concern:*

Be it known that I, EDWARD W. ANDEREGG, a citizen of the United States, and resident of Algoma, in the county of Kewaunee and State of Wisconsin, have invented new and useful Improvements in Fly-Nets, of which the following is a description, reference being had to the accompanying drawings, which are a part of this specification.

This invention consists of a fly net construction in which the cords are securely fastened to the bars by twisting or knotting the cords of adjacent pairs and inclosing the twists or knots between the strips of webbing forming the bars, such strips of webbing being stitched along their edges, and the stitches passing through the respective cords on opposite sides of the knots or twists.

With the above and other objects in view the invention consists in the fly net as herein claimed and all equivalents.

Referring to the accompanying drawing, the view is a detail view of a portion of a bar and the cords secured thereto, the strips of webbing forming the bar being separated to show the twisting arrangement of the cords.

In this drawing 10 indicates strips of webbing which are placed one upon the other to form the bar of the fly net. One cord 11 is paired with another cord 12, the two running parallel as usual between the bars, but being twisted or knotted together at 13 at the middle of the bar. The upper and lower strips of webbing 10 are stitched together by lines of stitching 14 near their edges, which lines of stitching not only pass through the strips of webbing 10 but through the cords 11 and 12 on each side of the twist or knot 13. By this means the cords of each pair are twisted or knotted together at their intersection with the bars to produce enlargements which, when the strips of webbing forming the bars are stitched together, form secure means for preventing the sliding of the cords through the bars, and thus the fly net is maintained in its true and proper shape at all times and there is no liability of the cords becoming disconnected from the bars.

What I claim as new and desire to secure by Letters Patent is:

1. In a horse fly net, a bar and parallel cords crossing the bar in pairs, the cords of each pair being twisted together at the middle of the bar, and lines of stitching extending along the edges of the bar and through the cords on either side of the twist thereof.

2. In a fly net, a bar comprising two strips of webbing, one placed upon another, parallel cords crossing the bar in pairs, the cords of each pair being twisted together in the middle of the bar between the strips of webbing, and lines of stitching extending along the edges of the strips of webbing to secure them together and passing through the cords on either side of the twist thereof, the twist of the cords between the strips of webbing forming an enlargement to prevent the slipping of the cords.

3. In a horse fly net, a bar and parallel cords crossing the bar in pairs, the cords of each pair being twisted together at the middle of the bar and at a point midway between their parallel lines and being transposed at the opposite sides of the bar, and lines of stitching extending along the edges of the bar and through the cords at points in the parallel portions thereof on opposite sides of the twist thereof.

In testimony whereof, I affix my signature, in presence of two witnesses.

EDWARD W. ANDEREGG.

Witnesses:
C. F. BOEDECKER,
JERRY JERABEK.

Copies of this patent may be obtained for five cents each, by addressing the "Commissioner of Patents, Washington, D. C."